Patented Aug. 27, 1929.

1,725,956

UNITED STATES PATENT OFFICE.

LEMMIE ROSCOE CLEVELAND, OF BOSTON, MASSACHUSETTS, ASSIGNOR TO NATIONAL ACADEMY OF SCIENCES, OF WASHINGTON, DISTRICT OF COLUMBIA.

STERILIZATION AND PRESERVATION OF FRUIT JUICES.

No Drawing.   Application filed December 21, 1925. Serial No. 76,908.

This invention relates to the sterilization and preservation of fruit juices, and includes a new and improved method of sterilization and preservation, as well as the sterilized and preserved fruit juices resulting therefrom.

According to the present invention, the fruit juices, after being clarified and freed from pulp, are subjected to the action of oxygen under pressure for a sufficient time to bring about their sterilization and preservation.

The fruit juices may be separated from the pulp in any suitable manner and then freed from pulp by suitable treatment, as by filtration through a suitable filter, or by centrifugal treatment in apparatus similar to a cream separator. By removing the pulp from the fruit juice, a clear liquid is obtained and one in which there will be no precipitate after sterilization. Moreover, the freer the juice is of pulp, the less apt it is to undergo change when confined in oxygen under pressure in accordance with the process of the present invention, for the oxygen seems to act a great deal more on the pulp than on the clear liquid. This is particularly true in plums and apples.

The clear liquid is next placed in containers in which it is to be sterilized. Where the sterilized fruit juice is to be marketed in bottles or other suitable containers, it may be placed in these containers before sterilization and subjected to sterilization while contained therein. It is evident that containers of various sizes can be used, and that, where large amounts of the fruit juice are to be sterilized, barrels or other large size containers can be used, and the fruit juice subjected to the sterilizing treatment while contained therein.

The containers in which the fruit juice is placed during sterilization should, if stoppered, have stoppers which will allow the free passage of gas into the container and of gas out therefrom, while not allowing microorganisms to enter the container; or the container should otherwise be protected from reinfection after it has been sterilized, as by sealing the container with a sterile stopper or closure while the contents are in a sterile condition.

Whatever the form or size or arrangement or construction of the container or containers in which the fruit juice is placed, they are treated in the container with oxygen under pressure. In the case of large containers, oxygen under pressure may be forced into the container in sufficient amount and under a sufficient pressure to bring about the sterilization. With smaller containers, they may in turn be enclosed in a large container into which the oxygen under pressure is introduced. Special steel tanks may be used for this purpose, which are gas tight and which will hold the oxygen under pressure while the fruit juice in the containers therein is being subjected to the oxygen under pressure and is undergoing sterilization.

The time of treatment of the fruit juice with the oxygen will vary, depending upon the pressure of the oxygen, the kind of fruit juice, the temperature at which the juice is kept, etc. In general, the time will be anywhere from ten to twelve hours up to two or three days or even more. The pressure of oxygen may advantageously be that readily obtainable with commercial oxygen supplied in cylinders, although the full pressure of the oxygen in the cylinder is not required. In general, commercial oxygen with a high partial pressure of oxygen should be used. Most commercial oxygen has at least 97% oxygen and some of it approaches 99 or 100%.

Most fruit juices, when kept for five days at 100 atmospheres of commercial oxygen pressure, are sterilized. In a few cases, however, a period of about six days has been required. If higher pressures are used, the time becomes shorter; while if lower pressures are used, it becomes somewhat longer. The fruit juice can be maintained under pressure for long periods of time, but in general this is not necessary to bring about sterilization, a maximum of about six days being ordinarily sufficient.

Where complete sterilization is not necessary or required, oxygen at a lower pressure or for a shorter time can be used. Oxygen at a much lower pressure than that indicated will completely inhibit the growth of bacteria, without killing them. The multiplication of practically all bacteria is completely inhibited even with oxygen pressure as low as atmospheric, if the treatment is continued for a sufficient time. However, there are usually enough enzymes, which are not destroyed at low pressures to bring about a slight alcoholic fermentation. In some instances, this slight alcoholic fermentation, with the development of a small percentage of alcohol, may be unobjectionable, or may even be desirable; but where such changes are to be avoided, and sterilization is to be effected, higher oxygen pressures should be used.

Investigations have shown that while some bacteria are killed outright in less than five days time at a pressure of 100 atmospheres of oxygen, and while many are killed in five days' time, a few are not killed even in ten days' time, or may not be killed during this period of time. Investigations have, however, shown that these bacteria, even though they are not killed by the high oxygen pressure, do not develop, that is multiply, in the fruit juices. In fact, the fruit juice medium is so unfavorable an environment for them that they usually all die within a period of about two to three weeks, and in this way complete sterilization is eventually realized as a result of confining the fruit juices in oxygen under pressure, that is, by oxygenation. It may be mentioned that harmful or pathogenic bacteria are the easiest ones to kill with oxygen according to the process of the present invention.

After the fruit juices have been subjected to the oxygen under pressure for a sufficient period of time, the oxygen pressure can be released and the oxygen transferred to another container and stored for further use. The containers may however be sealed while they still contain oxygen under pressure so that the fruit juice will be held in a container in which the atmosphere is oxygen under pressure; or the containers may be sealed while they contain oxygen under pressure approaching atmospheric. In the case of bottles, the bottles may be capped while they are still in an oxygen atmosphere with sterile caps so that the contents of the containers are protected from re-infection. The preserved and sterilized fruit juice in bottles or other containers, thus hermetically sealed, may then be labeled and stored for subsequent shipment or use.

When fruit juices are sterilized or preserved by confining them in oxygen under pressure, most of their natural color is lost, and in most juices there is a slight change in taste, owing to a very slight increase in acidity, but this will ordinarily be unobjectionable, and may even be desirable. In general, however, no change in taste occurs, or at least only a very slight change, in the juices of grape fruit and lemons.

Sugar in any quantity desired may be added to the juices before they are confined in oxygen under pressure. Moreover, the fruit juices may be concentrated, and preserved in concentrated form, either with or without the addition of sugar.

The fruit juices which are sterilized and preserved according to the present invention can be kept for long periods of time while retaining their natural fruit flavor, or with only a slight increase in acidity. In particular, they are free from any cooked taste such as results from sterilization or pasteurization by heating, and they are also free from chemical preservatives.

It will thus be seen that the present invention provides a new and improved method for the sterilization and preservation of fruit juices in which the fruit juices are subjected to the action of oxygen under pressure for a sufficient period of time to bring about sterilization, and that the sterilized fruit juices are then kept in suitable containers where the sterilized condition is maintained. The invention also presents a new and improved form of fruit juices in which the fruit juices are preserved in an oxygenated condition.

I claim:

1. The method of preserving fruit juices which comprises clarifying the juice and subjecting the same to the action of oxygen under pressure for a sufficient period of time to inhibit the growth of bacteria therein.

2. The method of preserving fruit juices which comprises clarifying the juice and subjecting the same to the action of oxygen under pressure for a sufficient period of time to effect substantially complete sterilization thereof.

3. The method of preserving fruit juices which comprises clarifying the juice and subjecting the fruit juices to an oxygen pressure of about 100 atmospheres for a sufficient period of time to effect substantially complete sterilization thereof.

4. The method of preserving fruit juices which comprises clarifying the juice and subjecting the same to the action of oxygen under pressure for a sufficient time to effect the desired sterilization, and sealing the fruit juices in an oxygen atmosphere.

5. The method of preserving fruit juices which comprises clarifying the juice and subjecting the fruit juices to the action of oxygen under pressure of about 100 atmospheres, and sealing the preserved fruit juices in an atmosphere of oxygen.

6. As a new product, a composition comprising a sterile clarified fruit juice and oxygen under pressure and relatively substantially free from other gaseous materials.

In testimony whereof I affix my signature.

LEMMIE ROSCOE CLEVELAND.